Nov. 13, 1962 R. ORSINI 3,063,614
VOLUMETRICALLY DEFORMED FLAT SACHET HAVING
AT LEAST ONE FLAT FACE
Original Filed Sept. 8, 1958 3 Sheets-Sheet 1

Nov. 13, 1962 R. ORSINI 3,063,614
VOLUMETRICALLY DEFORMED FLAT SACHET HAVING
AT LEAST ONE FLAT FACE
Original Filed Sept. 8, 1958 3 Sheets-Sheet 3

United States Patent Office 3,063,614
Patented Nov. 13, 1962

3,063,614
VOLUMETRICALLY DEFORMED FLAT SACHET
HAVING AT LEAST ONE FLAT FACE
René Orsini, 2 Blvd. J. Dalcroze, Geneva, Switzerland
Original application Sept. 8, 1958, Ser. No. 759,752, now Patent No. 3,003,681, dated Oct. 10, 1961. Divided and this application July 25, 1961, Ser. No. 126,724
2 Claims. (Cl. 229—22)

This is a divisional application of my application Serial No. 759,752 filed September 8, 1958, now matured into Patent No. 3,003,681.

My said patent has for its object a container or bag comprising at least two flat panels of deformable material each having lateral edges and a transverse bottom edge, the length of said bottom edge being less than the width of said panels between the lower ends of said lateral edges, and margins of said panels extending from said lower ends of said lateral edges to the end of said bottom edge, the said panels being sealed together at said edges and margins, and said margins being recessed.

These sachets are notably those made of flexible foil, especially thermoplastic film, or paper, cloth or similar material. Consequently, the terms welding line or sealing line will hereinafter refer either to the welding or gluing line between two superposed films or foils, or to a folding line when it is a question of a sheath or of a film folded into the shape of a V.

Upon being filled, known flat-lying sachets become deformed, giving a cushion-like shape, the two facings limited by the welds bulging outwards. Because of this, they do not present anywhere a flat surface capable of constituting a firm base. Such a flat surface constituting a firm base is however of particular interest for enabling the sachet to be stood upright after it has been opened or part-emptied.

The sachet according to my Patent No. 3,003,681 is characterized in that the flat facing referred to is obtained by formation of box folds in the recessed parts of the margins.

It is possible to fix upon a peripheral outline such that the sachet is deformed volumetrically, giving a fairly predetermined shape, notably any volumetric shape, prismatic or pyramidal, with a four or six sided base constituted by a regular or irregular geometrical figure but having an axis of symmetry passing through two apexes. The flatwise sachet then has a body reproducing the spread of the side facings which are superposed by folding along the edges terminating at the apexes of the base's axis of symmetry, and a bottom prolonging this body beyond the base line of the opened-out side facings, this bottom having surfaces which will ultimately constitute the flat facing or base, and the concertina of the box folds.

The sachet bottom is constituted as from the base line of the facings laid out flat. In the case of a hexagonal base, two intermediate apexes are fixed on this line, corresponding to the base of the prim's or pyramid's edges; then, from each outer apex a straight line is drawn which, with the base line, forms an angle equal to the half-angle at the corresponding apex of the base polygon, and a straight line—the so-called bottom axis line—is also drawn, forming with the two intermediate apexes a geometrical figure identical with that formed by the axis of symmetry of the base with the two corresponding apexes in the base section. Two points are selected on this straight line and each of the points is joined to a point on the said, preceding, corresponding straight line in such a way that the bisector of the angle thus formed passes through the nearest intermediate apex.

In the case of a four-sided outline, there is only one intermediate apex corresponding to two merged apexes and the said straight line of the bottom axis can turn about this point until is passes through one of the outer apexes, in which case there is only one concertina portion, or it can occupy any intermediate position with the attendant formation of two concertinas.

Such sachets when they are filled have a volume which is defined by comparatively flat surfaces; however, by reason of the lack of rigidity of the constituting material said surfaces have a tendency to assume a slight bulge; in order to cut out such bulges, it is of advantage to associate with the plastic film surfaces which form the fluid-tight sachets, semi-rigid reinforcements. Moreover said sachets do retain their volumetrically deformed shape only due to the action of an internal hydrostatic pressure and this may be too low when the sachet is partly emptied. The presence of semi-rigid reinforcements allows to assure that the sachet will retain its shape even when fully emptied.

According to the improvement object of my present invention, the sachet, made of flexible material, is sheathed in a semi-rigid surface. This surface may have folding scarves and may extend over the whole of the sachet's outer surface with the exception of the parts which undergo deformation in order to give rise to the concertina-like swellings.

To assure that the sachet will retain its shape even when fully emptied, the semi-rigid sheathing elements include tabs which bend over underneath the base or flat surface, these tabs being joined together and locked in place by a flap made of water proofed carton or similar material.

Other characteristics of my improved invention will emerge from the description which now follows relating to numerous examples of execution, in which references will be made to the accompanying drawings, in which.

Figure 1:
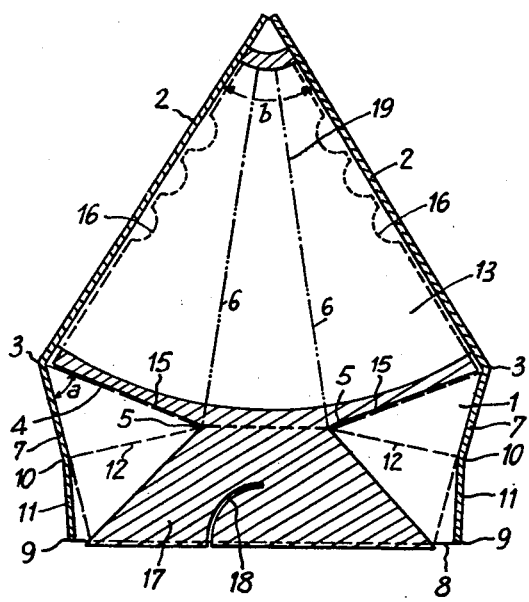
FIG. 1 is a flat view of a sachet which deforms volumetrically to assume the shape of a pyramid with a base of hexagonal shape.

FIGS. 1 to 4 illustrate an improvement to the type of sachets or bags described in my Patent No. 3,003,681 and made of thin plastic films. The fluidtight part of the sachet made of a plastic film includes as described in the parent application two sheets 1 of thermoweldable material superposed one on the other and joined together by two lateral welds 2 forming between them an angle $b$ equal to half the sum of the apical angles of the lateral faces of the pyramid to be formed by said sachet deformed volumetrically. The length of said lateral welds 2 is equal to the length of a ridge of the said pyramid and they terminate at the apex 3. Starting from apexes 3 a broken line 4 is drawn which marks on the flat the lower edges of the lateral sides of the pyramid to be obtained, said broken lines showing apexes 5 corresponding to the lower point of intermediate ridges 6 of the pyramid. Starting also from the apexes 3, lines 7 are drawn, forming with the base line 4 an angle $a$ equal to the half-angle at the corresponding apex of the base. In a similar manner a line 8 is drawn parallel to and distant from line 4, between apexes 5—5, by the height of the base semi-trapezium. On this line 8 two points 9 are taken situated outside the points of intersection of straight lines 7 and 8, said points being at a distance from the line of symmetry equal to half the diagonal joining the apexes on the base which is being produced. Points 9 are joined each to a point 10 on straight line 7 by a line 11, points 9 being such that each line 11 describes with the corresponding line 7 an obtuse angle whose bisector 12 passes through the nearest apex 5.

In said sachet 7 and 11 are materialized by a weld, whilst line 8 is formed by a fold between both sheets 1 which are formed from a single V folded film of a thermoweldable material.

Upon being filled, the parts of said sachet comprised between 3—5—9 and 10 fold inside along lines 12 and form a box fold, points 9 being applied against points 3 and the semi-trapeziums 9—5—5—9 coming flat to form a flat bottom, the parts between welds 2 and line 4 bulging outside to form the lateral faces of the pyramid with lines 6 as ridges.

As described such sachets when they are filled have a pyramidal volume with a hexagonal bottom which is defined by comparatively flat surfaces; however, by reason of the lack of rigidity of the constituting material, said surfaces particularly the lateral ones have a tendency to assume a slight bulge. Moreover when the said sachet is partly emptied it tends to resume its flat form.

According to the improvement which is the object of the present invention at least a part of the plastic film surfaces which form the faces of the volumetrically deformed sachet are associated with semi-rigid reinforcements. The improvement illustrated in FIGS. 1 to 4 has for its object to provide by simple means a simple connection of such a reinforcement with the actual fluidtight bag or sachet. In this embodiment two surfaces 13 of a thermoweldable material are constituted each by a circular sector the apical angle of which is equal to angle $b$ between the edges 2 of sheets 1. Sheets 1 and said surfaces are piled up with their edges registering and welds 2 when provided form the sachet and rigidly secure to the sachet the sector shaped film surfaces 13. This forms on each side of the sachet a sheath between the corresponding surface of the actual sachet and the plastic films 13. The reinforcement is constituted by a cut-out piece of cardboard including two sections 14, each section having a surface corresponding to the development of the lateral surfaces bounded at their lower ends by the lines 15 and laterally by a line slightly within the inner lateral edge of the welds 2. The lateral edges of these two sections 14 are provided preferably with cut-out recesses 16. These two sections 14 are connected through their lower ends extending between the points 5 by a hexagonal surface folded diametrically so as to form two trapeziums 17, the height of which is equal to one half of the breadth of the bottom of the sachet. Furthermore, said bottom is provided with a semi-circular cut-out recess 18 arranged symmetrically with reference to the central fold. The sections 14 are furthermore provided with initiating folds 19 corresponding to the ridges 6 defining the volume of the finished sachet.

The reinforcement thus constituted is inserted through introduction of the sections 14 underneath the surfaces 13 inside the sheath already referred to.

Figure 2:
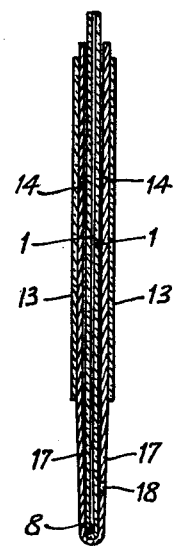
FIG. 2 is a section through line II—II of FIG. 1.
Figure 3:
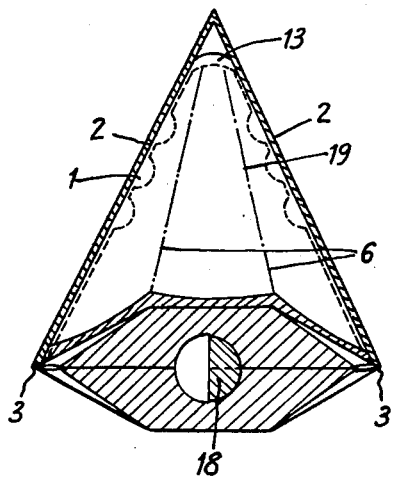
FIG. 3 is a perspective view of the sachet as per FIG. 1 in a filled condition.
Figure 4:
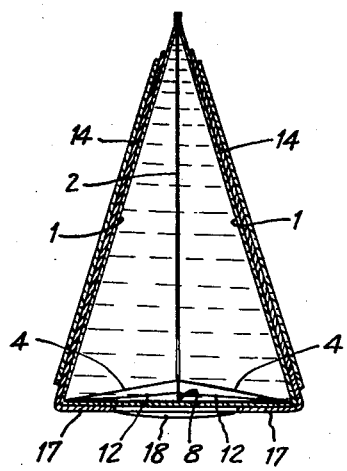
FIG. 4 is a vertical section through line IV—IV of FIG. 3.

When filled, the sachet is deformed and assumes the position illustrated in FIGS. 2 and 4. The two trapeziums 17 enter then a common place forming the bottom of the sachet and it is sufficient to turn down the lug formed by the cut-out section 18 so as to lock the bottom of the sachet and thereby the whole sachet in its expanded volume condition through the reversal of the direction of fold of said lug.

Figure 5:
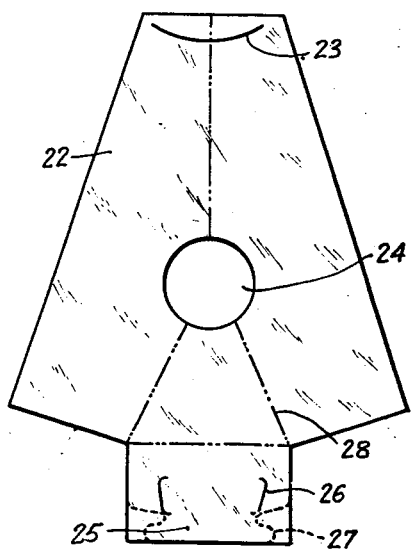
FIG. 5 is a flat view of another embodiment of the reinforcement pieces for a sachet similar to that of FIG. 1.
Figure 6:
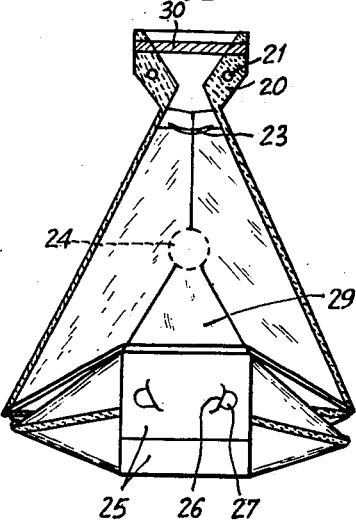
FIG. 6 is a perspective view of the sachet as per FIG. 5 after filling.

The sachets of FIGS. 5 and 6 are similar to those of FIGS. 1 to 4 except that near their neck the welds 2 are enlarged so as to provide surfaces 20 with perforations 21 which enable the sachet to be gripped more easily, with the aid of a pair of pliers, for example, in order to place it on the filling machines or to be suspended by perforations 21 on two pins placed on either side of the filled neck, or to provide the filled sachet with a piece of string forming a handle and so enabling it to be carried.

The strengthening pieces are constituted by two cut-out pieces of carton represented in FIG. 5. These two strengthening elements have a principal surface of fairly trapezoidal shape 22 fitting between the welds 2 of strips 13 and extending beyond the latter upwards, this surface being provided with a cut-out 23 giving rise to a tab and a circular shaped perforation 24. This surface's 22 lower portion is limited by two straight lines corresponding to the outline of two of the sachet's base edges starting from welds 2, the centre portion being extended by the rectangular tab 25 which, in one instance, has two fairly parallel cut-outs 26 and, in the other instance, two tabs 27 shown in dotted lines and capable of engaging in the said cut-outs 26.

The carton shape thus produced is provided with folding scarves 28 shown in broken lines, these folding scarves 28 joining the centre hole to the edge of the blank as shown, in such a way as to pre-shape the facings of the assembled and filled sachet.

The strengtheners above described are slipped between the sachet and strips 13, the tabs 23 being passed over the strip 13 in such a way as to hold the strengtheners in place. Then, the sachet is filled, the base of the said sachet changing its shape and tending to give a flat base of hexagonal shape; then the two tabls 25 are bent back under this base and they are fastened with the aid of the tabs 27 fitted in the cut-outs 26, the sachet assuming the shape shown in FIGURE 6.

The folding scarves 28 produce on this sachet, side edges which give it a pyramidal shape on a diamond-shaped base with two triangular facets 29 terminating on the centre perforation 24. All that now remains is to close off the sachet's opening by a weld 30.

The sachet has a good rigidity by virtue of the base formed by the tabs 25 and its own geometrical shape; the perforations 24 provide a grip surface for the fingers holding the sachet.

When its is desired to make use of the sachet's contents, all that is necessary is to cut the apex of the angle formed between welds 20 and 30. It is possible to obtain two pouring spouts of different sections.

Figure 7:
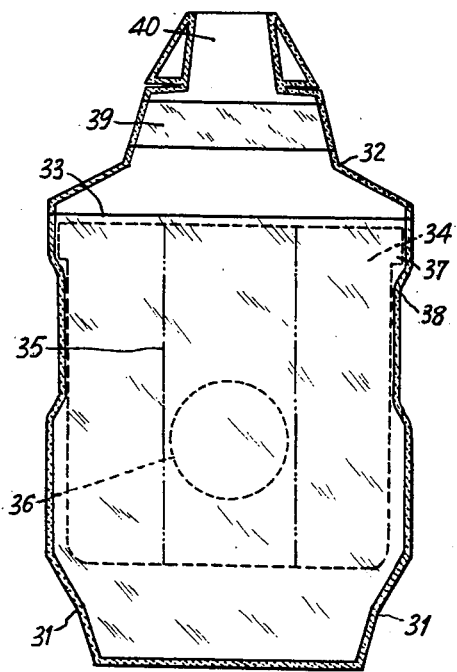
FIG. 7 is a view, on the flat, of another type of sachet forming a hexagonal bottle
Figure 8:
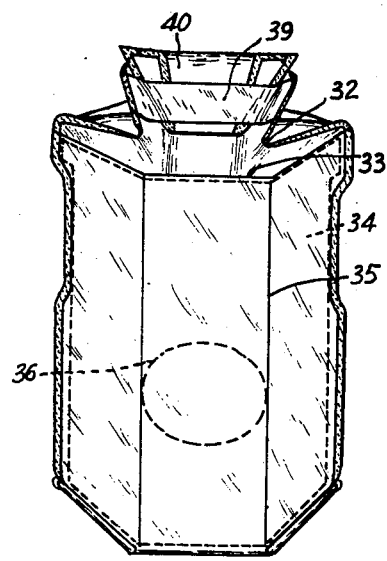
FIG. 8 is a perspective view of the sachet as per FIG. 7 after filling.

The sachet of FIGS. 7 and 8 is of the type with an outline having at the base, box angles 31 and, at the apex, other box angles 32 between the side welds and the portion forming the neck, so as to produce the box folds which form automatically to give a hexagonal base and an upper surface whose general shape is also hexagonal.

The lower portion of the sachet is sheathed on its two facings by a film 33 gripped at its edges in the lateral welds used in the formation of the sachet. Thus, there are produced, on the two facings, two pockets in which it is possible to fit strengtheners such as cartons 34 having folding scarves 35 following the outline of the side edges of the volumetric shape which the sachet under consideration is intended to assume when it is filled. These strengtheners may have openings such as 26 which, if the thermoplastic films happen to be transparent, make it possible to see the liquid contained in the sachet. In order to ensure that the said strengtheners are held in place, they can include portions of extra width such as 37 which are caught up in narrowing sections in the space between the films 33 and the sachet proper, these narrowing sections being produced for example, by weld-line 38.

The neck of the sachet as per FIGURE 7 has a special shape as illustrated in the drawing. A transverse strip 39 fitted between the two lateral welds of the base of the neck makes it possible to re-close the fitted sachet in a sufficiently fluidtight manner, by folding back the neck 40 a matter of 180° and fitting this folded-back portion under strip 39.

Figure 9:
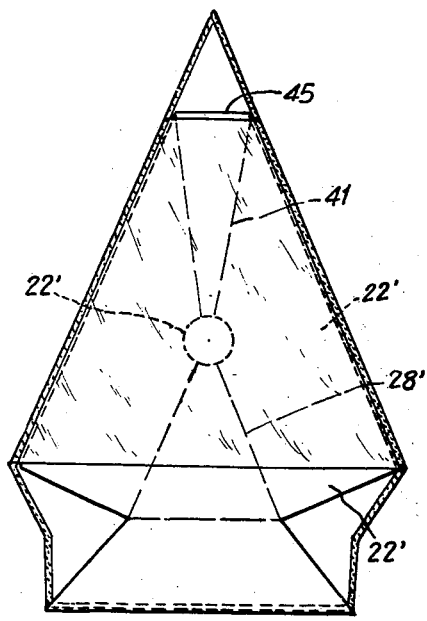
FIG. 9 is a view on the flat of a pyramidal sachet with carton strengthening piece ensuring that the apex is gripped tight.
Figure 10:
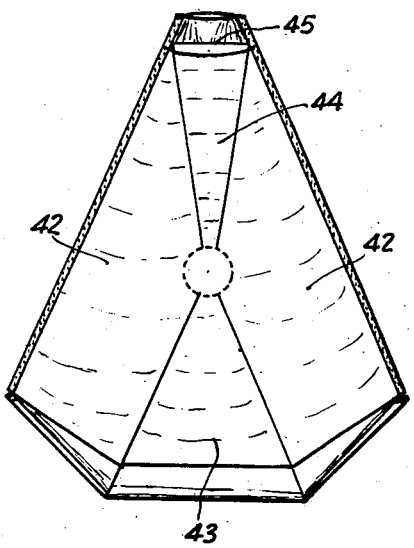
FIG. 10 is a perspective view of the same sachet in a filled condition, the top being cut off.

The sachet of FIGURES 9 and 10 is similar to that of FIGURES 5 and 6. It differs from it essentially by virtue of the fact that the thin carton strengthener 22' has, as from hole 24' and in the direction of its upper rectilinear edge, two folding scarves 41 terminating in the upper corners of the strengthener. The lower folding scarves 28' running from hole 24' towards the base have been retained. When the sachet, totally or partially filled is placed on its base as shown in FIGURE 10, the facings produced by the folding scarves tend to assume a convex shape so as to give rise to the pyramidal shaping of the flat foil with hole 24' as the apex, but facings 42 and 43, subjected to a higher hydrostatic pressure and which have a larger, surface area, undergo the maximum deformation, facing 44 staying practically flat. The free edges 45 grip between them the apex of the plastic sachet, practically forming a pincer-like grip giving a degree of fluid-tightness in the open sachet sufficient to prevent evaporation.

Figure 11:
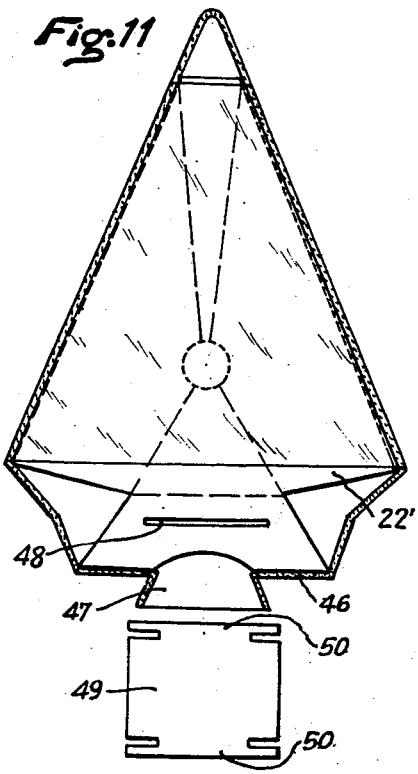
FIG. 11 is a view on the flat of a bottom-filled sachet.
Figure 12:
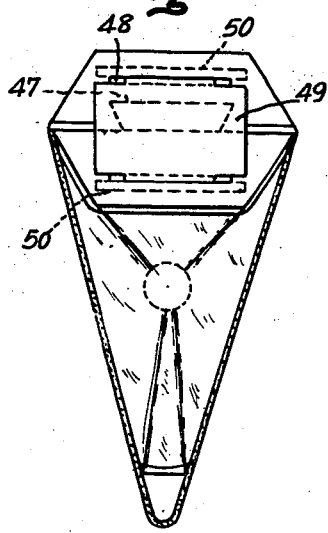
FIG. 12 is a perspective view of the sachet as per FIG. 11 after filling.

The sachet of FIGURES 11 and 12 is similar to that described above but, in the course of its being manufactured, the weld produces, along base axis weld 46, a filling neck 47. The portion of the strengthener cartons 22' corresponding to the base, has a slit 48. The strengthener proper is completed by a cap 49 made preferably of waterproofed carton or similar material, having two opposing T-shaped tongues 50.

The sachet is filled in an upside-down position after which the neck 47 is closed by a weld made as closely as possible to the base axis weld. The sachet is then put into shape, the neck being bent back underneath the strengthener's bottom tabs 22'. The cap 49 is then placed in position, tongues 50 being fitted in slits 48 so as to lock the base in position, as can be seen in FIGURE 12. The said cap 49 also protects the base when the latter is placed on a damp surface.

The methods of execution as described in the foregoings by way of example are capable of being made the subject of many modifications without departing from the scope of the invention.

What I claim is:

1. A container comprising at least two flat panels of deformable material each having lateral edges and a transverse bottom edge, the length of said bottom edge being less than the width of said panels between the lower ends of said lateral edges, and margins of said panels extending from said lower ends of said laterial edges to the end of said bottom edge, the said panels being sealed together at said edges and margins, said margins being recessed and said fluidtight sachet of deformable material being sheathed on at least a part of its two faces with surfaces of thermoweldable film which are retained by the fluidtight sachet lateral forming welds so as to form lateral sheaths in which are inserted semi-rigid strengthening surfaces.

2. A container comprising at least two flat panels of deformable material each having lateral edges and a transverse bottom edge, the length of said bottom edge being less than the width of said panels between the lower ends of said lateral edges, and margins of said panels extending from said lower ends of said lateral edges to the end of said bottom edge, the said panels being sealed together at said edges and margins, said margins being recessed and said fluidtight sachet of deformable material being sheathed on at least a part of its two faces with surfaces of thermoweldable film which are retained by the fluidtight sachet lateral and bottom forming welds so as to form lateral second sachets in which are inserted semi-rigid strengthening surfaces.

References Cited in the file of this patent

UNITED STATES PATENTS

| | | |
|---|---|---|
| 1,433,800 | Conley | Oct. 31, 1922 |
| 2,282,207 | Palmer | May 5, 1942 |
| 2,301,087 | Snyder | Nov. 3, 1942 |
| 2,446,308 | Smith | Aug. 3, 1948 |
| 2,936,940 | Merghgracht | May 17, 1960 |
| 2,951,628 | Grussen | Sept. 6, 1960 |
| 3,003,681 | Orsini | Oct. 10, 1961 |

FOREIGN PATENTS

| | | |
|---|---|---|
| 1,243,186 | France | Oct. 29, 1960 |